United States Patent [19]

Boom et al.

[11] 4,032,959
[45] June 28, 1977

[54] SHIELDED SUPERCONDUCTING INDUCTOR DEVICE

[75] Inventors: Roger W. Boom; Ronald W. Moses, Jr.; Harold A. Peterson; Warren C. Young, all of Madison, Wis.

[73] Assignee: Wisconsin Alumni Research Foundation, Madison, Wis.

[22] Filed: Dec. 18, 1974

[21] Appl. No.: 533,852

[52] U.S. Cl. .................. 323/44 F; 336/DIG. 1; 324/34 SC; 363/14
[51] Int. Cl.² .................. H01L 39/08; H01F 27/36; H02J 15/00
[58] Field of Search .................. 307/306; 317/13 D; 321/8 CD; 323/44 F; 324/34 SC, 43 SC, 71 SC; 335/214, 216; 336/DIG. 1

[56] References Cited

UNITED STATES PATENTS

| | | | |
|---|---|---|---|
| 3,443,255 | 5/1969 | Massar | 323/44 F |
| 3,579,035 | 5/1971 | Burnier et al. | 307/306 X |
| 3,671,902 | 6/1972 | Westendorp | 336/DIG. 1 |

Primary Examiner—A. D. Pellinen
Attorney, Agent, or Firm—Theodore J. Long; John M. Winter; Harry C. Engstrom

[57] ABSTRACT

An inductor device having a superconducting coil winding capable of maintaining a relatively large current flowing therethrough, and a normal conducting shield winding surrounding the superconducting coil. The superconducting coil and the shield are electrically connected in parallel with the shield functioning to maintain the current and the magnetic field in the superconducting coil substantially constant. The superconducting inductor device can be used to store energy and to return the stored energy to an energy consuming load over a relatively short period without incurring large losses in the superconducting material. This result is obtained by making the self inductance of the shield substantially equal to the mutual inductance between the shield and the superconducting coil, or by inserting a controlled compensating voltage source in series with the shield, so that pulse currents are conducted by the shield. Proper spacing of the shield windings around the superconducting coil will result in substantially no magnetic field present in the coil due to current in the shield.

18 Claims, 5 Drawing Figures

SHIELDED SUPERCONDUCTING INDUCTOR DEVICE

BACKGROUND OF THE INVENTION

1. Field of the Invention

This invention pertains generally to the field of superconducting inductive devices and more particularly to superconducting inductive devices and energy storage devices having magnetic shields.

2. Description of the Prior Art

There are many instances where it is desirable to be able to store energy for various periods of time, and return it to a power distribution system as needed. One example is the electric power industry, wherein the load on the power systems is not constant but fluctuates markedly from hour to hour. In the course of a typical day, the peak load during the day-time may be on the order of twice the maximum night-time load. At present, pumped water storage is the only means being employed by the power industry to achieve even a small degree of load leveling. It may also be desirable and even necessary to have energy storage devices capable of augmenting the commercial supply of power to a load which requires large amounts of energy for short periods of time, wherein the average power requirements are moderate but peak power requirements are very high.

One type of energy storage device receiving increased attention is a superconducting magnet or inductor, which is capable of maintaining a large current for very long periods of time with negligible energy loss in the inductor itself. However, one of the problems encountered in using superconducting inductors for energy storage purposes or for transformer, motor or generator windings is that for high energy exchange rates, the rapid changes in fields and currents cause energy losses in the superconducting winding. These losses are in fact enhanced for a typical stabilized superconducting magnet in which there are superconducting filaments buried in a matrix of normal metal, such as copper or aluminum. In a typical case the losses are possibly 100 times greater in the composite conductor made up of copper plus niobium-titanium filaments as compared to an equivalent size conductor of copper alone. These losses are primarily due to so-called coupling losses, and the eddy currents developed in the copper stabilizer. Excessive eddy currents can generate a prohibitive amount of heat and localized high intensity magnetic fields, which may result in loss of superconductivity in small portions of the superconductor with the result that still more heating and loss of superconductivity occurs. To avoid these losses it is thus desirable to minimize the variation in the current and the magnetic fields in the superconductor.

SUMMARY OF THE INVENTION

We have invented a shielded superconducting inductor device one application of which provides for the storing of large amounts of electrical energy and returning this energy to an energy consuming load, while minimizing the losses incurred in storing and exchanging the energy in the device. Other applications include superconducting transformer, motor and generator windings. Our shielded superconducting inductor device preferably has an inductive coil composed of a superconducting winding which is capable of maintaining a relatively constant large current flowing through the coil. A shield winding composed of ordinary conductors surrounds the superconducting inductive coil, and is electrically connected in parallel with the coil. The shield has the function of maintaining the magnetic field and the current in the superconducting inductive coil at substantially a constant value despite variations in current through the parallel shield and inductive coil.

Two requirements must be met if the shield is to keep the magnetic field and current in the superconducting inductive coil effectively constant:

1. The pulse current caused by energy transfer to and from the shielded inductor device composed of the shield and the superconducting inductive coil must be diverted through the shield so that the superconducting coil current is fixed and its self field is constant, and 2. The pulse current in the shield should produce no field in the superconducting inductive coil.

We have determined that the first requirement may be substantially satisfied if the self inductance of the shield is equal to the mutual inductance between the shield and the superconducting inductive coil, wherein the shield and the superconducting inductive coil are electrically connected in parallel. The second requirement may be satisfied by winding the conductors of the shield around the inductive coil, with the turns of the shield windings being distributed about the surface of the inductive coil in such a way that the magnetic field due to current in the shield turns is approximately zero everywhere inside the shield. This may be substantially accomplished by making the turn to turn separation of the conductors of the shield at any portion of the shield inversely proportional to the tangential magnetic field at that portion which is due to the current in the shield windings itself.

The current in the superconducting inductive coil may vary somewhat because the resistance of the shield windings is not zero. To compensate for resistive voltage drop in the shield winding, a controlled voltage source may be inserted in series with the shield winding to substantially cancel the voltage drop caused by the resistance of the shield. The compensating controlled voltage source may also be utilized to maintain the current in the superconducting inductive coil substantially constant even if the self inductance of the shield is not equal to the mutual inductance between the shield and the inductive coil.

Further objects, features and advantages of our invention will become apparent from the following detailed description taken in conjunction with the accompanying drawings showing a preferred embodiment of our invention.

DESCRIPTION OF THE PREFERRED EMBODIMENT

Figure 1:
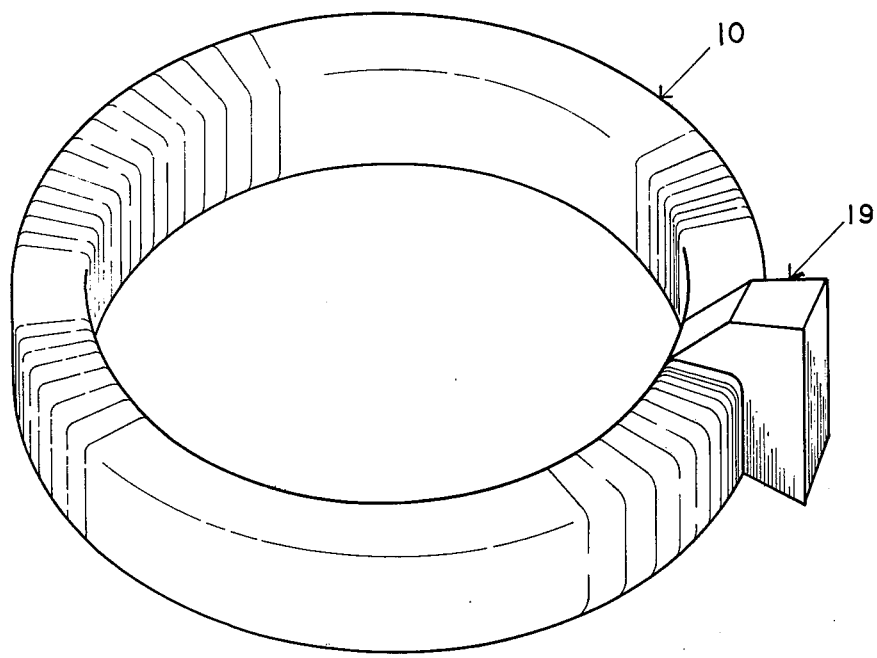
FIG. 1 is a perspective view of the exterior of our shielded superconducting inductor device.

Referring now more particularly to the drawings, wherein like numerals refer to like parts throughout the several views, a preferred embodiment of our shielded superconducting inductor device is shown generally at 10 in FIG. 1. The shielded superconducting inductor device 10 will generally be connected to a source of electrical power, such as standard alternating current power lines, wherein the power lines will also be connected to a load of some sort which consumes electrical power. However, our invention does not depend on the type of electrical power supplied to the shielded superconducting inductor device 10, or on the type of load to which electrical power is supplied. Moreover, our shielded inductor device may be utilized in other devices employing superconducting inductors, such as motors and generators.

Figure 2:
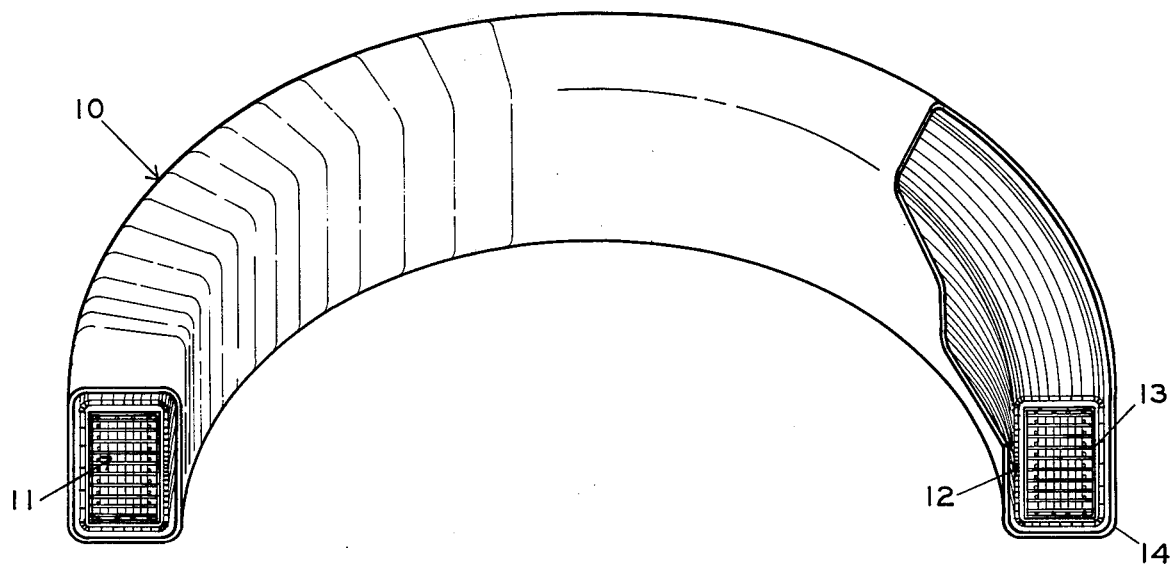
FIG. 2 is a cross-sectional view of the shielded superconducting inductor device of FIG. 1, with portions of the insulating walls of the device broken away to show the interior construction thereof.

The shielded inductor device 10 is shown in cross-section in FIG. 2 with portions of the insulating walls broken away to show the internal construction of the device. The shielded inductor device 10 has a superconducting inductive coil 11 composed of at least one turn of composite conductor 11a, wherein the composite conductor preferably consists of a superconducting material such as a niobium-titanium embedded in a normal metal such as high purity copper or aluminum. The turns of composite conductor 11a are preferably substantially parallel to one another and are wound together to form a solenoidal shaped superconducting inductive coil 11 as shown in FIGS. 1 and 2. Although a solenoidal shaped inductive coil has been shown for illustrative purposes, our invention is not limited to a superconducting coil having a particular geometry. Liquid helium or super-fluid helium may be passed or pumped through passageways (not shown) between the composite conductors to cool the composite conductor down to superconducting temperatures, typically 4.2° K which is the boiling point of helium at atmospheric pressure.

An electrically conductive magnetic shield winding 12 is placed around the superconducting inductive coil 11 in the manner shown in FIG. 2. The shield winding 12 has multiple turns of conductor 12a shown in FIG. 3 composed of a normal conducting metal such as high purity aluminum or copper. The turns of conductor 12a of the shield winding 12 are substantially parallel to the turns of the superconducting inductive coil 11, and the turns of both the solenoidal shield winding 12 and the solenoidal superconducting inductive coil 11 are oriented about a single major axis — as shown in FIGS. 1 and 2, the vertical axis.

Figure 3:
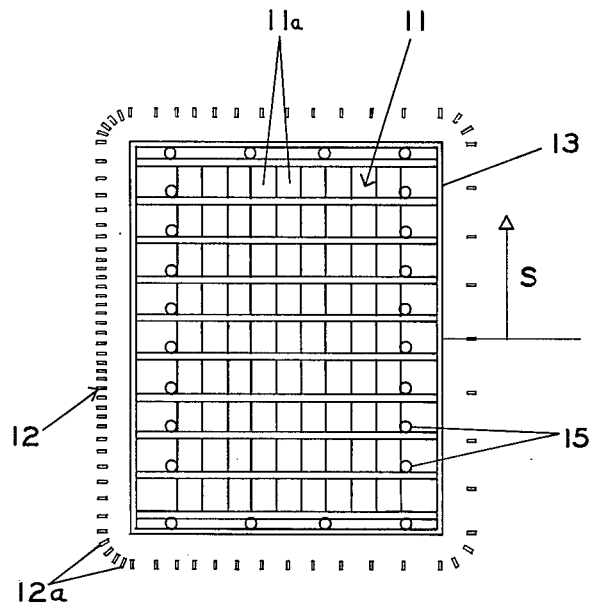
FIG. 3 is a somewhat simplified cross-sectional view of the superconducting inductive coil winding and the normal conducting shield coil winding of the device of FIG. 1.

An insulating dewar 13 surrounds the superconducting coil 11 in the space between the coil 11 and the shield 12 to inhibit heat flow into the coil. A vacuum chamber wall 14 surrounds and encloses the shield 12 and the dewar 13, with the space inside the vacuum chamber wall 14 being substantially evacuated to provide additional heat insulation. Test coil conductors 15, as best shown in FIG. 3, may be distributed around the inductive coil 11. These conductors can be utilized to sense the magnetic field inside the shield, for the purposes described below.

Figure 4:
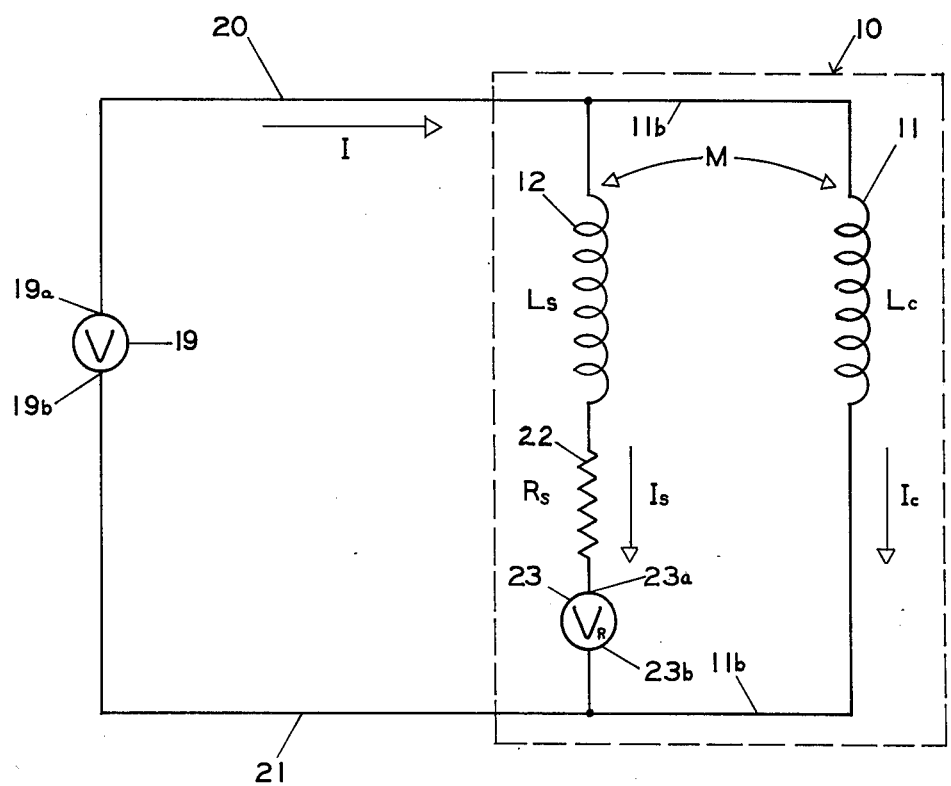
FIG. 4 is a schematic electrical circuit diagram of the shielded superconducting inductor device of FIG. 1, showing the interconnection of the device with a converter for providing energy to and withdrawing energy from the device.

The shielded superconducting inductor device 10 is connected to a converter 19 as shown in FIG. 1, and illustrated schematically in FIG. 4, wherein the converter 19 is capable of receiving alternating current power from a power system (not shown in FIG. 4) and delivering direct current power to the shielded superconducting inductor device 10, and receiving direct current power from the device 10 and delivering alternating current power to the power system. The superconducting inductive coil 11 is connected electrically in parallel to the shield winding 12 with superconducting connecting lines 11b, and the converter 19 is connected to the parallel combination of the shield and the inductive coil through ordinary conductor lines 20 and 21. To minimize losses, the ordinary conductors 20 and 21 should be kept as short as possible. For illustrative purposes, the resistance of the shield winding 12 has been represented in FIG. 4 as a lumped resistor 22 of resistance $R_s$. A compensating voltage source 23, having output terminals 23a and 23b and an output voltage $V_R$ may also be electrically connected in series with the shield 12 to compensate for the effect of the shield resistance $R_s$. The use of the compensating voltage source 23 is desirable although not absolutely necessary, and its purpose will be explained further below.

The converter 19 may be considered as a source of voltage which varies periodically with time, the voltage across the converter terminals 19a and 19b varying between positive and negative values. Positive voltage across the converter corresponds to a charging condition wherein energy flows into the shielded superconducting inductor device, and negative voltages across the converter 19 corresponds to the withdrawal of energy from the shielded superconducting inductor device. As shown in FIG. 4, a current I is assumed to flow into the shielded superconducting inductor device 10, a current $I_s$ flows through the shield coil 12 which is assumed to have a self inductance equal to $L_s$, and a current $I_c$ is considered to flow through the superconducting inductive coil 11 which has a self inductance equal to $L_c$. The mutual inductance between the shield 12 and the superconducting coil 11 is considered to be equal to M. The circuit represented in FIG. 4 may be analyzed by summing voltages around the loop which includes the shield and the superconducting inductive coil to yield the following equation:

$$-V_R - I_s R_s - L_s \frac{dI_s}{dt} - M \frac{dI_c}{dt} + L_c \frac{dI_c}{dt} + M \frac{dI_s}{dt} = 0$$

The above equation may be solved for $dI_c/dt$ to give $$\frac{dI_c}{dt} = \frac{(L_s - M)\frac{dI_s}{dt} + I_s R_s + V_R}{L_c - M}$$

The change in superconducting coil current, $dI_c/dt$, thus may be minimized if $L_s = M$ and if $R_S$ is made as small as possible. For the solenoidal superconducting coil 11 and the solenoidal shield 12 surrounding it, $L_S$ may be set substantially equal to M by making the number of turns in the shield equal to the number of turns in the superconducting coil.

It is apparent that it could be possible to have no time varying current in the superconducting inductive coil if the shield resistance $R_S$ were zero. This of course would be the ideal situation since there would be no power loss in either the shield or the superconducting coil. This is not feasible, since even if the shield were made of superconducting material it would still have a significant resistance when subjected to time varying currents, and in fact, the time varying current losses in a superconducting shield could be greater than in a normal metal shield. However, the shield can be made of a high purity normal conducting metal such as aluminum or copper and be kept at cryogenic temperatures (e.g. near or below the 20° K "knee" in the aluminum resistivity curve) by means of a liquid helium bath or by the helium evaporating from the superconducting coil, so that the resistance in the shield is minimized.

Analysis of the circuit of FIG. 4 demonstrates that by matching the self inductance of the shield to the mutual inductance between the shield 12 and the superconducting coil 11, and by reducing the resistance of a shield to a minimum, substantially all of the time varying currents will be eliminated from the superconducting coil and will be conducted only by the normal conducting shield. Thus, very little change in magnetic field will be felt by the superconducting coil due to current flowing through it since such current will be substantially constant. A steady state current will exist in the superconducting inductive coil, and this current will build up slowly over time as net energy is supplied to the shielded superconducting inductor device 10, and will decrease slowly over time as energy is withdrawn. The D.C. current will be forced to flow in the inductive coil, because of the resistance of the shield. Thus, if the same amount of energy is supplied to the shielded superconducting inductor device 10 per cycle as is withdrawn per cycle, the current in the inductive coil will be substantially constant. However, even if there is a net flow of energy into or out of the inductive coil, the current in the inductive coil will change so slowly that A.C. losses in the superconducting material will be minimal and the current in the coil will be substantially constant with respect to the period of the time varying currents in the shield.

To further minimize the changes in current in the superconducting coil 11, the compensating voltage source 23 may be inserted in series with the shield coil 12, wherein the voltage across the terminals 23$a$ and 23$b$ of the voltage source in the direction of shield current $I_s$ will be approximately $V_R = I_S R_S$. The voltage source 23 thus acts effectively as a negative resistance to cancel the resistive voltage drop across the shield 12. The compensating voltage source 23 is highly desirable if the shield is to be operated at room temperature where the shield conductors would have significant resistance. It is apparent that the voltage source 23 may also be used to compensate for changes in the shield current even if the self inductance of the shield is not equal to the mutual inductance between the shield and the superconducting coil.

Even though the current in the superconducting coil 11 is maintained substantially constant, the varying current in the shield 12 may produce varying localized magnetic fields in the supperconducting coil. These time varying fields may result in many of the detrimental eddy current effects discussed above. It is thus desirable to minimize the field produced inside the shield 12 from currents flowing through the shield. This result may be substantially accomplished for the shielded superconducting inductor device 10 of FIG. 1 as may be illustrated by reference to FIG. 3.

FIG. 3 is a cross-sectional view of the superconducting inductive coil 11 and the shield 12 without the vacuum chamber wall 14. The superconducting coil composite conductor turns 11$a$ are packed closely together, with the bundle of turns having a substantially rectangular periphery. The shield coil conductor turns 12$a$ are preferably spaced slightly away from the superconducting inductive coil 11, and are disposed in spaced relation to one another in a substantially rectangular arrangement with rounded corners, which surrounds the entire minor circumference of the solenoidal superconducting coil.

It is possible to minimize the magnetic field inside the shield due to current in the shield by properly selecting the spacing between the turns in the shield. For a shield having a sufficient number of turns, the field inside the shield can be reduced to low levels which will not have a detrimental effect on the superconducting inductive coil. The spacing between the shield turns may be selected to accomplish this minimization in the following manner.

Referring to FIG. 3, a distance along the periphery of the shield from the midplane of the shield to a particular conductor may be defined as S, with the distance to the $i$th conductor being $S_i$, and the total peripheral length being defined as 2L. A shield having uniformly spaced conductors and varying currents is first determined, with $N'$ parallel turns being placed uniformly along the shield surface at positions $S_i$ such that $$S_i = (i - \tfrac{1}{2})(2L/N'),$$

$$i = 1, 2, \ldots, N'$$

The $i$th conductor carries a current $I_i$ which is a function of $S_i$.

The magnetic field inside the shield will be zero if all paths inside the shield enclosing the solenoid axis link the same amount of magnetic flux. These paths can be approximated by the test coil conductors 15, which may be assumed to consist of M turns of conductor. The magnetic flux passing through the $j$th conductor 15 is defined as $\phi_j$. The flux $f_{ji}$ linking the $j$th conductor 15 caused by current in the $i$th shield conductor may be calculated by standard procedures, and the total flux linking the $j$th test conductor, is $$\phi_j = \sum_{i=1}^{N'} f_{ji} I_i$$

Rather than solving the numerous equations for the current $I_i$, it is possible to obtain a fairly good approximation by making a partial Fourier expansion of the current distribution:

$$I_i = \sum_{n=0}^{k} A_n \cos n\pi \frac{S_i}{L}$$

The flux in the $j$th test conductor thus is $$\phi_j = \sum_{i=1}^{N'} f_{ji} \sum_{n=0}^{k} A_n \cos n\pi \frac{S_i}{L} \text{ or } \phi_j = \sum_{n=0}^{k} F_{jn} A_n$$

The average flux in the M test conductors 15 is $$\overline{\theta} = \frac{1}{M} \sum_{j=1}^{M} \phi_j$$

The mean square deviation of flux through the test conductors 15 is $$D = \frac{1}{M} \sum_{j=1}^{M} (\theta_j - \overline{\theta})^2$$

The average current can be normalized by setting $A_o$ to a specific value, for example, $A_o = 1/N'$. $A_1, A_2, \ldots, A_k$ may then be calculated using the method of least squares to minimize D. For the solenoid shown in FIGS. 1 and 2, we have found that good results in minimizing flux deviation are obtained with parameters of the order of magnitude of $N' = 100$, $M = 40$, and $k = 6$.

Where all the currents in the shield conductors are the same, the approximate current density that will minimize the field inside the shield is $$I(s) = N' \sum_{n=0}^{k} A_n \cos n\pi S/L$$

where the current is normalized such that $$\frac{1}{2L} \int_0^s I(s)ds = C(s), \, C(2L) = 1$$

The shield is then divided into N segments corresponding to the spacing between the shield turns such that $$C(S_{i+1}) - C(S_i) = 1/N$$

for $i = 1, 2, \ldots, N-1$.

This may be done by use of the recursion relation $$S_{i+1} = S_i + \frac{2L}{NI(Si)}$$

where $S_1 = L/NI(0)$

The accuracy of this method may be enhanced by solving for $S_i$ from $S = 0$ to L, and then solving for $S_i$ from $S = L$ to 0. A weighted average of the two solutions is then used to determine the proper position of the shield turns, which will be approximately as shown in FIG. 3.

It is apparent that the above method can be used to calculate the shield spacing for a shield having virtually any cross-sectional geometry. We have also found that, as an approximation, it is possible to substantially minimize the magnetic field internal to the shield if the turn to turn separation of the conductors of the shield at any portion of the shield is selected to be inversely proportional to the magnitude of the tangential magnetic field at that portion of the shield due to current in the shield.

The test coil conductors 15 may be utilized to provide a fine adjustment for the spacing of the shield conductors before the inductor device 10 is placed in service. With pulsed currents impressed on the shield 12, the spacing of the shield conductors may be physically adjusted to minimize the variations in the flux passing through the test coil conductors. The test coil would be of no further use after the spacing of the shield conductors is established and the shield superconducting inductor device is placed in service.

Figure 5:
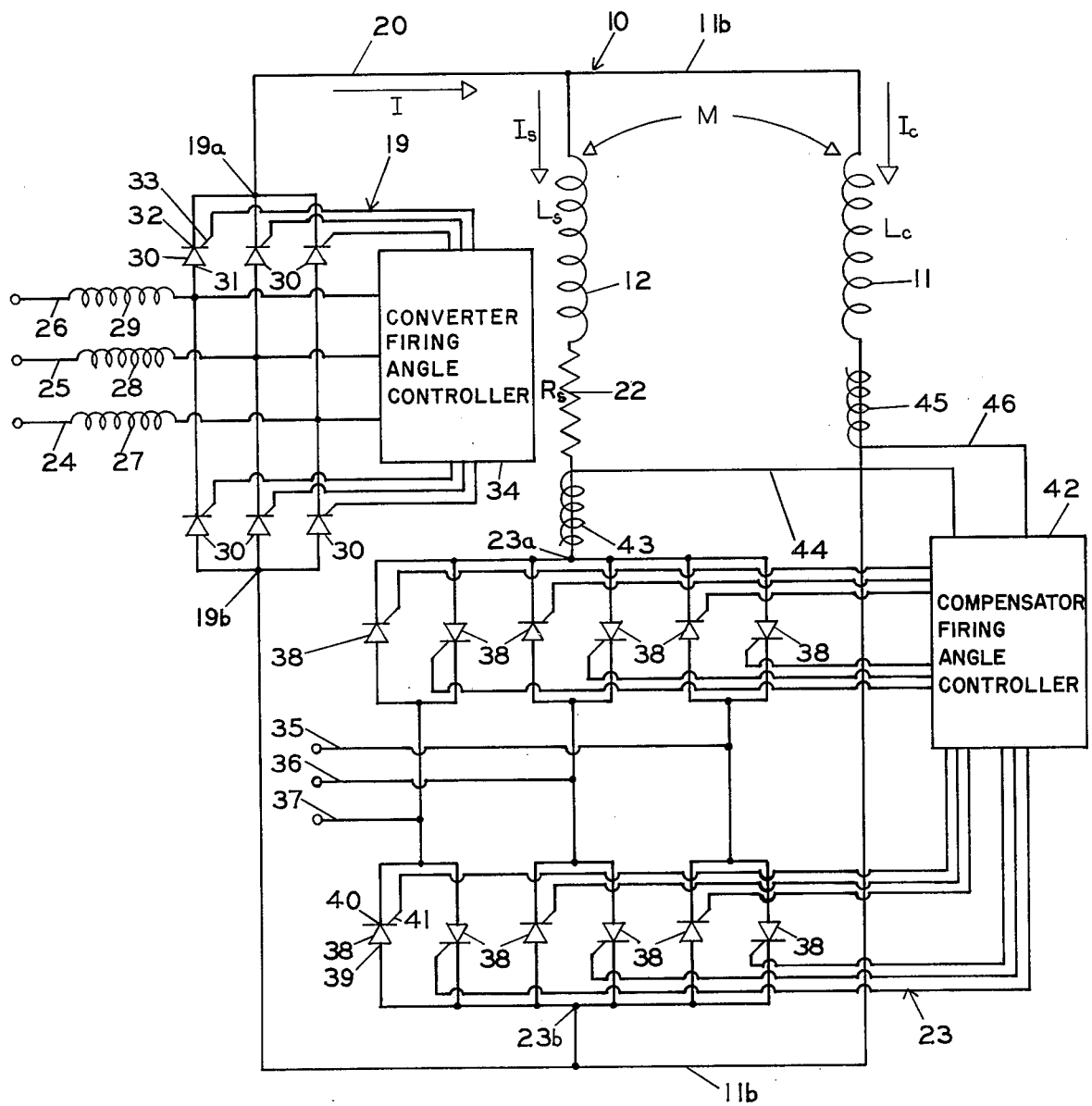
FIG. 5 is a schematic circuit diagram of the shielded superconducting inductor device of FIG. 1 interconnected with a converter, showing a preferred embodiment for a converter which is adapted to be connected to a three phase power system, and a compensating voltage source in series with the shield winding.

Referring to FIG. 5, a preferred embodiment of the converter-voltage source is shown generally at 19, and a preferred embodiment of the compensating voltage source is shown generally at 23, these particular embodiments being appropriate where the source of power available to the inductor device 10 is three phase power. The converter 19 as shown in FIG. 5 is adapted to be connected to a source of three phase alternating current (AC) power, as provided by power lines 24, 25, and 26.

Each power line 24, 25, and 26 may have a commutating reactance 27, 28, and 29, respectively, associated with the line. The converter 19 is a reversible converter which is capable of either charging or discharging the shielded superconducting inductor device 10. When the converter is charging or supplying energy to the device 10, the converter changes the three phase alternating current of the power lines 24, 25, and 26 into direct current which flows into the device 10. In the charging or energy supply mode of operation of the converter 19, the converter produces a positive voltage between the output terminals 19a and 19b. When the converter 19 is discharging the device 10, a negative voltage is developed across the terminals 19a and 19b, that is, the terminal 19b is at a higher potential than the terminal 19a. The power withdrawn by the converter will thus be equal to the current I flowing in the connecting lines 20 and 21 times the voltage across the terminals 19b and 19a. The effective source resistance of the converter 19 must, of course, be very small, since extremely large currents will be flowing in the connecting lines 20 and 21, with the contemplated currents being in the range of tens of thousands of amperes. Thus even a small amount of source resistance could produce extremely large voltages across the converter 19.

The converter 19 preferably has six controlled rectifiers for controlling the flow of power into and out of the inductor device 10. These controlled rectifiers may be solid state thyristors having an anode 31, a cathode 32, and a control electrode 33. The controlled rectifiers 30 are connected in pairs in series between the terminals 19a and 19b, in a bridge circuit, with the anode 31 of one rectifier in each pair being connected to the terminal 19b, and the cathode 32 of the other rectifier in each pair being connected to the terminal 19a. The other anode and cathode of each pair of rectifiers is electrically connected to one of the power lines 24, 25, or 26. A control electrode 33 of each rectifier 30 is connected to a firing angle controller 34. The controller 34 may be electrically connected as shown to the 3 power lines 24, 25, and 26, to control the firing angle of the rectifiers 30 in response to the voltages between the power lines. The controller 34 will typically be of the well-known type that through firing angle setting, permits withdrawal of power from the power lines when the pulsed power demanded by the load is small, and returns power to the power lines from the shielded superconducting inductor device 10 when the pulsed power demanded by the load is high, thus tending to maintain a constant power demand from the power system.

The voltage source 23 as shown in FIG. 5 may be supplied with three phase A.C. power from power lines 35, 36 and 37, which may also be connected to the main power lines 24, 25, and 26. Alternatively power may be supplied to the voltage source 23 from a separate source of A.C. power. The compensator 23 maintains the voltage across the compensator output terminals 23a and 23b at a voltage which is approximately equal to the negative of the current $I_s$ flowing in the shield winding times the resistance $R_s$ of the shield winding, in order to cancel the effect of resistive losses in the shield. A voltage source similar to the converter 19 may be employed, to convert the 3 phase alternating current power on the power lines 35, 36, and 37 to direct current power between the output terminals 23a and 23b. The compensator 23 however, has 12 controlled rectifiers 38, which are connected in a bridge circuit in oppositely poled pairs between one of the output terminals 23a or 23b and one of the three power lines 35, 36, and 37. The rectifiers 38 must be provided in oppositely poled pairs since the compensator 23 must be able to conduct current in both directions between the terminals 23a and 23b, while maintaining control over the voltage across the terminals. The rectifiers 38 may be solid state thyristors having an anode 39, a cathode 40, and a control electrode 41.

The firing of the rectifiers 38 is controlled by a compensator firing angle controller 42 which is connected to the control electrodes 41 of each of the rectifiers 38. Since the resistance of the shield $R_s$ is distributed throughout the shield winding, it is not possible to directly measure the voltage across the shield resistance. However, the controller 42 may receive a reference signal which is proportional to the current flowing in the shield winding, and may thereby calculate the required voltage that is necessary to cancel the resistive losses in the shield. This may be accomplished by placing a current transducer 43 around the conductor of the shield 12 and developing a reference voltage in the transducer 43, transmitted by a conductor 44 to the controller, which is proportional to the current flowing in the shield winding. This signal will, of course, be directly proportional to the voltage drop in the resistance of the shield winding. Alternatively, a current transducer 45 may be mounted around the conductor 11a of the superconducting inductor coil 11 to measure the inductor coil current. The signal voltage developed in the transducer 45 will be transmitted by a conductor 46 to the controller 42, and the controller will respond to any changes in the current in the superconducting inductor coil 11 by varying the firing angles of the rectifiers 38 to minimize those changes.

The controlled voltage source 23 is thus capable of directly minimizing the change in current in the superconducting coil even if the self inductance of the shield $L_s$ is not equal to the mutual inductance M between the shield and the superconducting coil. However, if the difference in magnitude between $L_s$ and M becomes too large, excessive amount of power will be required from the voltage source 23 in order to maintain the current in the superconducting coil substantially constant.

It is apparent that the converter-voltage source 19 may be constructed to utilize single phase A.C. power. Similarly, the controlled voltage source 23 may be constructed utilizing single phase A.C. power, or regulated D.C. power, in a manner well known in the art. Thus, our shielded superconducting inductor device 10 may be utilized with a single phase power system, or any standard multiple phase power system.

It is understood that our invention is not confined to the particular construction and arrangement of parts herein illustrated and described, but embraces all such modified forms thereof as may come within the scope of the following claims.

We claim:

1. A shielded superconducting inductor device comprising:
    a. an inductive coil having at least one turn of conductor, said conductor being composed of a superconducting material;
    b. a magnetic shield having at least one turn of normal conducting material, said magnetic shield and said inductive coil being electrically connected together in parallel so as to be mutually aiding; and
    c. the self inductance of said magnetic shield being substantially equal to the mutual inductance between said magnetic shield and said inductive coil, substantially all of the time-varying currents impressed on the shielded superconducting inductor device being conducted by said shield and the time-varying current conducted by said superconducting inductor being substantially zero.

2. The shielded superconducting inductor device as specified in claim 1, including means for maintaining said inductive coil at superconducting temperatures and for maintaining said magnetic shield at cryogenic temperatures.

3. The shielded superconducting inductor device as specified in claim 1, wherein said inductive coil has a plurality of turns of superconducting material and said shield has a plurality of turns of normal conducting material, the turns of said magnetic shield being disposed in spaced relationship substantially surrounding said inductive coil, and wherein the spacing between said magnetic shield turns is selected to minimize the magnetic field in said inductive coil due to current in said magnetic shield.

4. The shielded superconducting inductor device as specified in claim 3, wherein the turns of said magnetic shield are substantially parallel to and substantially surround the turns of said inductive coil, and wherein the spacing between said shield turns, at any portion of the shield, is inversely proportional to the magnitude of the magnetic field due to current in the shield which is tangential to the portion of the shield and substantially normal to the turns of the shield.

5. The shielded superconducting inductor device as specified in claim 1, wherein the conductor of said inductive coil comprises a composite conductor having a superconducting material embedded in a normal conductor.

6. The shielded superconducting inductor device as specified in claim 1, including a compensating voltage source electrically connected in series with said shield, the voltage across said voltage source in the direction of shield current being controlled by the shield current to be substantially equal to the negative of the resistive voltage drop across said shield.

7. The shielded superconducting inductor device as specified in claim 1, including a compensating voltage source electrically connected in series with said shield, the voltage across said voltage source being controlled by the current in said inductive coil to minimize changes in the current in said inductive coil.

8. A shielded superconducting inductor device comprising:
    a. an inductive coil having a plurality of turns of conductor wound substantially parallel to one another to form a coil, said conductor being composed of a superconducting material;

b. a magnetic shield composed of a plurality of turns of normal conducting material disposed substantially parallel to the turns of said inductive coil and being spaced surrounding said inductive coil with the spacing between said turns in said magnetic shield being selected to minimize the magnetic field in said inductive coil due to current in said shield, said magnetic shield and said inductive coil being electrically connected together in parallel so as to be mutually aiding; and c. said magnetic shield having the same number of turns as said inductive coil to make the self inductance of said magnetic shield substantially equal to the mutual inductance between said shield and said inductive coil, substantially all of the time-varying currents impressed on the shielded superconducting inductor device being conducted by said shield and the time-varying current conducted by said superconducting inductor being substantially zero.

9. The superconducting inductor device as specified in claim 8, wherein the spacing between said shield turns, at any portion of the shield, is inversely proportional to the magnitude of the magnetic field tangential to the portion of the shield and substantially normal to the turns of the shield and which is due to the current in the shield.

10. The shielded superconducting inductor device as specified in claim 8, including means for maintaining said inductive coil at superconducting temperatures and for maintaining said magnetic shield at cryogenic temperatures.

11. The shielded superconducting inductor device as specified in claim 8, wherein the conductor of said inductive coil comprises a composite conductor having a superconducting material embedded in a normal conductor.

12. The shielded superconducting inductor device as specified in claim 8, including a compensating voltage source electrically connected in series with said shield, the voltage across said voltage source in the direction of shield current being controlled by the shield current to be substantially equal to the negative of the resistive voltage drop across said shield.

13. The shielded superconducting inductor device as specified in claim 8, including a compensating voltage source electrically connected in series with said shield, the voltage across said voltage source being controlled by the current in said inductive coil to minimize changes in the current in said inductive coil.

14. A shielded superconducting inductor device comprising:

a. an inductive coil having a plurality of turns of conductor wound substantially parallel to one another to form a coil, said conductor being composed of a superconducting material;

b. a magnetic shield composed of a plurality of turns of normal conductive material disposed substantially parallel to the turns of said inductive coil and being spaced surrounding said inductive coil, with the spacing between said turns in said magnetic shield being selected to minimize the magnetic field in said inductive coil due to current in said shield, said magnetic shield and said inductive coil being electrically connected together in parallel; and c. a compensating voltage source electrically connected in series with said shield, the voltage across said voltage source being controlled to minimize changes in the current in said inductive coil.

15. The shielded superconducting inductor device as specified in claim 14, wherein the voltage across said voltage source is controlled by the current in said inductive coil to minimize changes in the current in said inductive coil.

16. The shielded superconducting inductor device as specified in claim 14, wherein the voltage across said voltage source is controlled by the shield current to minimize changes in the current in said inductive coil.

17. The shielded superconducting inductor device as specified in claim 14, wherein the conductor of said inductive coil comprises a composite conductor having a superconducting material embedded in a normal conductor.

18. The shielded superconducting inductor device as specified in claim 14, including means for maintaining said inductive coil at superconducting temperatures and for maintaining said magnetic shield at cryogenic temperatures.

* * * * *